(12) United States Patent
Tabuchi

(10) Patent No.: US 7,059,105 B2
(45) Date of Patent: Jun. 13, 2006

(54) CONTINUOUS WRAPPING MACHINE AND CONTINUOUS WRAPPING METHOD OF MAGNETIC POWDER

(75) Inventor: Kunihiro Tabuchi, Kagawa (JP)

(73) Assignee: Toa Machine Industry, Inc., Kagawa (JP)

( * ) Notice: Subject to any disclaimer, the term of this patent is extended or adjusted under 35 U.S.C. 154(b) by 0 days.

(21) Appl. No.: 10/680,191

(22) Filed: Oct. 8, 2003

(65) Prior Publication Data

US 2004/0261369 A1   Dec. 30, 2004

(30) Foreign Application Priority Data

Jun. 26, 2003   (JP) .............................. 2003-182477

(51) Int. Cl.
  *B65B 9/04* (2006.01)
(52) U.S. Cl. .......................................... 53/553; 53/555
(58) Field of Classification Search .................. 53/553, 53/555, 560, 450, 454, 474
See application file for complete search history.

(56) References Cited

U.S. PATENT DOCUMENTS 3,279,367 A * 10/1966 Brown, Jr. .................. 101/150
4,375,146 A *  3/1983 Chung ......................... 53/453
5,081,819 A *  1/1992 Cloud .......................... 53/453
5,459,980 A * 10/1995 Kenney et al. ................ 53/450
5,869,148 A *  2/1999 Silverschotz et al. ....... 427/549
6,591,584 B1 *  7/2003 Saito ........................... 53/450

FOREIGN PATENT DOCUMENTS

| JP | 6-080108 | * | 8/1992 |
| JP | 7-124193 | * | 5/1995 |
| JP | 7-61414 | * | 7/1995 |
| JP | 07-108687 | B2 | 11/1995 |

* cited by examiner

*Primary Examiner*—Stephen F. Gerrity
*Assistant Examiner*—Hemant M. Desai
(74) *Attorney, Agent, or Firm*—Rader, Fishman & Grauer

(57) ABSTRACT

A compact and efficient continuous wrapping machine capable of measuring out certain amounts of a magnetic powder automatically and wrapping them in wrapping film, the continuous wrapping machine comprising a measuring drum, a sealing drum, and a sealing device. The measuring drum includes a means for retaining measured-out amounts of the magnetic powder on its periphery and a means for cutting off the retaining force of the retaining means to transfer the measured-out amounts of the magnetic powder to the sealing drum. The sealing drum includes a means for retaining the measured-out amounts of the magnetic powder on a first continuous wrapping film fed onto its periphery. The sealing device seals the first continuous wrapping film and a second continuous wrapping film, which is fed onto the measured-out amounts of the magnetic powder on the sealing drum, together around each of the measured-out amounts of the magnetic powder.

4 Claims, 10 Drawing Sheets

F I G. 2
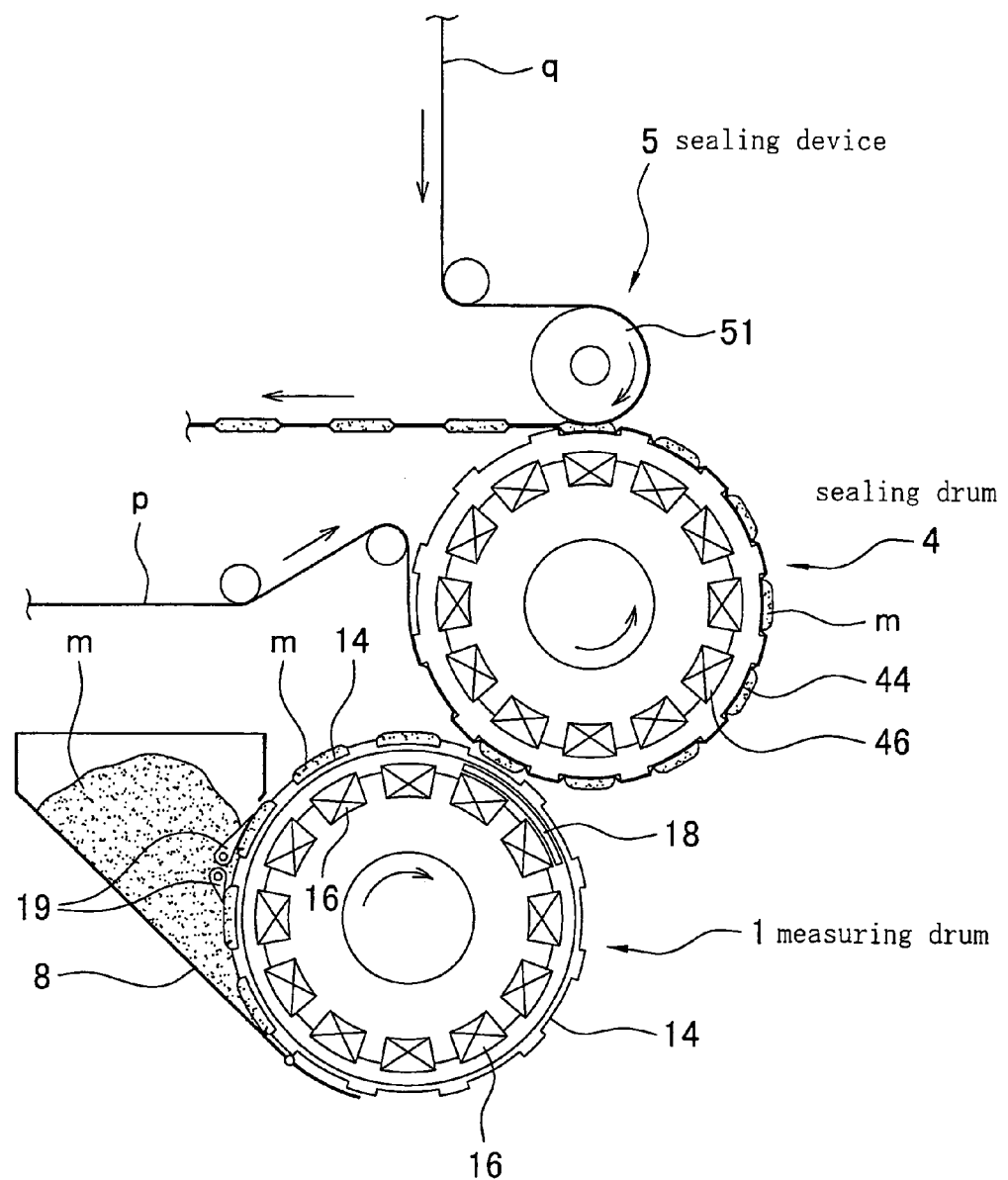

F I G. 6
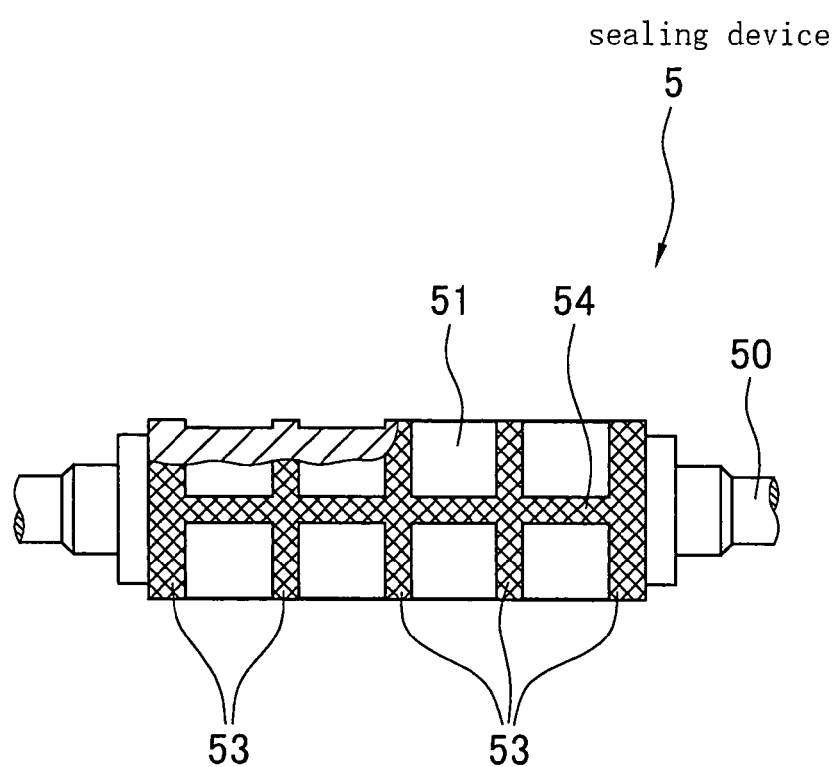

CONTINUOUS WRAPPING MACHINE AND CONTINUOUS WRAPPING METHOD OF MAGNETIC POWDER

BACKGROUND OF THE INVENTION

This invention relates to a continuous wrapping machine and a continuous wrapping method of magnetic powder. More specifically, this invention relates to a wrapping machine and a wrapping method to wrap magnetic powder such as materials of disposable pocket body warmers in wrapping film automatically and continuously.

Disclosed in the Japanese Examined Patent Publication No. 108687/H7 (1995) is a manufacturing machine of a disposable pocket body warmer, which comprises four drums; i.e., a measuring drum, a transfer drum, a conveying drum, and a sealing drum. With the four drums working in conjunction with one another, the machine measures out certain amounts of a material and puts the measured-out amounts of the material between continuous wrapping films, and seals the films together to produce body warmers efficiently.

On the other hand, the inventor of the present invention made a further study and completed a magnetic powder-wrapping technology which enables the construction of a compact continuous wrapping machine capable of producing body warmers efficiently.

SUMMARY OF THE INVENTION

According to the first feature of the present invention, there is provided a continuous wrapping machine for wrapping a magnetic powder in wrapping film, which comprises a measuring drum, a sealing drum, and a sealing device. The measuring drum includes a means for retaining measured-out amounts of the magnetic powder on its periphery and a means for cutting off the retaining force of the retaining means to transfer the measured-out amounts of the magnetic powder to the sealing drum. The sealing drum includes a means for retaining the measured-out amounts of the magnetic powder on a first continuous wrapping film fed onto its periphery. The sealing device seals the first continuous wrapping film and a second continuous wrapping film, which is fed onto the measured-out amounts of the magnetic powder on the sealing drum, together around each of the measured-out amounts of the magnetic powder.

According to the second feature of the present invention, there is provided the continuous wrapping machine of the first feature. The magnetic-powder-retaining means of the measuring drum comprises magnets which are arranged under a plurality of recesses formed in the periphery of the measuring drum. The retaining-force-cutting-off means of the measuring drum comprises a magnetic-screening plate disposed between its inside and magnets.

According to the third feature of the present invention, there is provided the continuous wrapping machine of the first feature. The magnetic-powder-retaining means of the sealing drum comprises magnets which are arranged under a plurality of recesses formed in the periphery of the sealing drum.

According to the fourth feature of the present invention, there is provided the continuous wrapping machine of the first feature. The sealing device comprises a sealing roller with sealing strips on its periphery for sealing the first and second continuous wrapping films together around each of the measured-out amounts of the magnetic powder.

According to the fifth feature of the present invention, there is provided a method of wrapping a magnetic powder in wrapping film continuously. The method comprises the steps of (i) measuring out certain amounts of the magnetic powder and putting the measured-out amounts of the magnetic power between first and second continuous wrapping films, and (ii) sealing the first and second continuous wrapping films together with heat around each of the measured-out amounts of the magnetic powder.

The advantages offered by the first feature of the present invention are as follows. While turning, the measuring drum measures out certain amounts of a magnetic powder, retains them on its periphery with its magnetic-powder-retaining means, and carries them to the zone, where its retaining-force-cutting-off means is disposed, to transfer them onto the first continuous wrapping film being fed onto the periphery of the sealing drum. While the sealing drum is turning, the measured-out amounts of the magnetic powder are retained on the first continuous wrapping film by the magnetic-powder-retaining means of the sealing drum and overlaid with a second continuous wrapping film fed to the sealing drum. Then, the sealing device seals the first and second wrapping films together around each of the measured-out amounts of the magnetic powder. Thus, the measuring, wrapping, and sealing of the magnetic powder are carried out continuously by the rotation of the two drums. Besides, the measuring, wrapping, and sealing are efficient because there is not such energy loss in rotational motion as there is in reciprocating motion. Moreover, the main components of the continuous wrapping machine are the two drums alone; therefore, the continuous wrapping machine is relatively compact.

The advantages offered by the second feature of the present invention are as follows. Measured-out amounts of magnetic powder in recesses of the measuring drum are retained in them by the attraction of magnets inside the measuring drum; accordingly, measured-out amounts of magnetic powder in recesses of the measuring drum are carried toward the sealing drum without falling out of recesses. Besides, the magnetic force of magnets inside the measuring drum is cut off by the magnetic-screening plate of the retaining-force-cutting-off means of the measuring drum at the transfer zone between the measuring drum and the sealing drum; accordingly, measured-out amounts of magnetic powder in recesses of the measuring drum are transferred into recesses of the sealing drum without fail.

The advantage offered by the third feature of the present invention is as follows. Measured-out amounts in recesses of the sealing drum are retained by the attraction of magnets inside the sealing drum; accordingly, measured-out amounts of magnetic powder in recesses of the sealing drum are carried toward the sealing device without falling out of recesses.

The advantages offered by the fourth feature of the present invention are as follows. The sealing roller of the sealing device has sealing strips on its periphery; accordingly, the first and second continuous wrapping films are sealed together around measured-out amounts of magnetic powder without fail. Besides, the sealing is made just by the rotational motion of the sealing device; therefore, the sealing is made continuously and efficiently.

The advantages offered by the fifth feature of the present invention are as follows. Certain amounts of the magnetic powder is measured out, and the measured-out amounts of magnetic powder are put between first and second continuous wrapping films; accordingly, the continuous wrapping of magnetic powder can be accomplished just by sealing the first and second wrapping films around each of the measured-out amounts of magnetic powder.

BRIEF DESCRIPTION OF THE DRAWINGS

The features and advantages of the present invention will become more clearly appreciated from the following description in conjunction with the accompanying drawings, in which:

FIG. 2 is a side view of the main part of the continuous wrapping machine of FIG. 1.

FIG. 6 is a partially sectional front view of the sealing device of FIG. 2.

DETAILED EXPLANATION OF THE INVENTION

Figure 1:
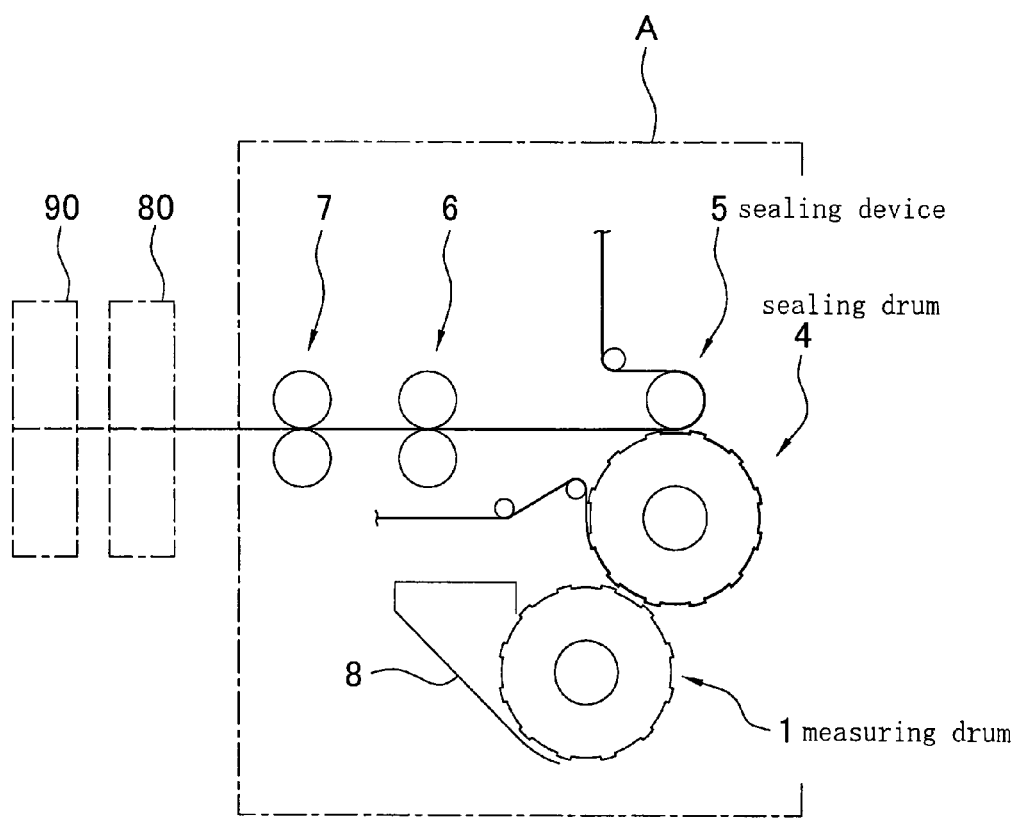
FIG. 1 is a schematic side view of an embodiment of continuous wrapping machine of the present invention.

Referring to the drawings, a preferred embodiment of continuous wrapping machine of the present invention is now described. The continuous wrapping machine wraps up measured-out amounts of a magnetic powder, which is a material for the production of disposable pocket body warmers, in film continuously.

In FIG. 1, the reference sign "A" is the continuous wrapping machine, which comprises a measuring drum 1, a sealing drum 4, and a sealing device 5. In addition to these components, a second sealing device 6 and a cooling device 7 may be provided. The second sealing device 6 and the cooling device 7 are not indispensable but add to the reliability of the continuous wrapping machine A.

If a cutter 80, which cuts two continuous films carrying measured-out amounts of magnetic powder therebetween into packets, and a packing machine 90, which packs a certain number of packets at a time, are provided downstream of the continuous wrapping machine A, pocket body warmers are produced continuously.

FIG. 2 shows the main part of the continuous wrapping machine A; i.e., the measuring drum 1, the sealing drum 4, and the sealing device 5.

The measuring drum 1 is provided with a hopper 8, which stores and feeds a magnetic powder "m" to the measuring drum 1. The magnetic powder "m" is composed of iron powder, water, vermiculite, activated carbon, salts, and so on.

The measuring drum 1 measures out certain amounts of magnetic powder "m" and feeds them to the sealing drum 4. The measuring drum 1 is provided with a means for measuring out certain amounts of magnetic powder "m", a means for retaining the measured-out amounts of magnetic powder "m" on the periphery of the measuring drum 1, and a means for cutting off the retaining force of the magnetic-powder-retaining means.

Figure 3:
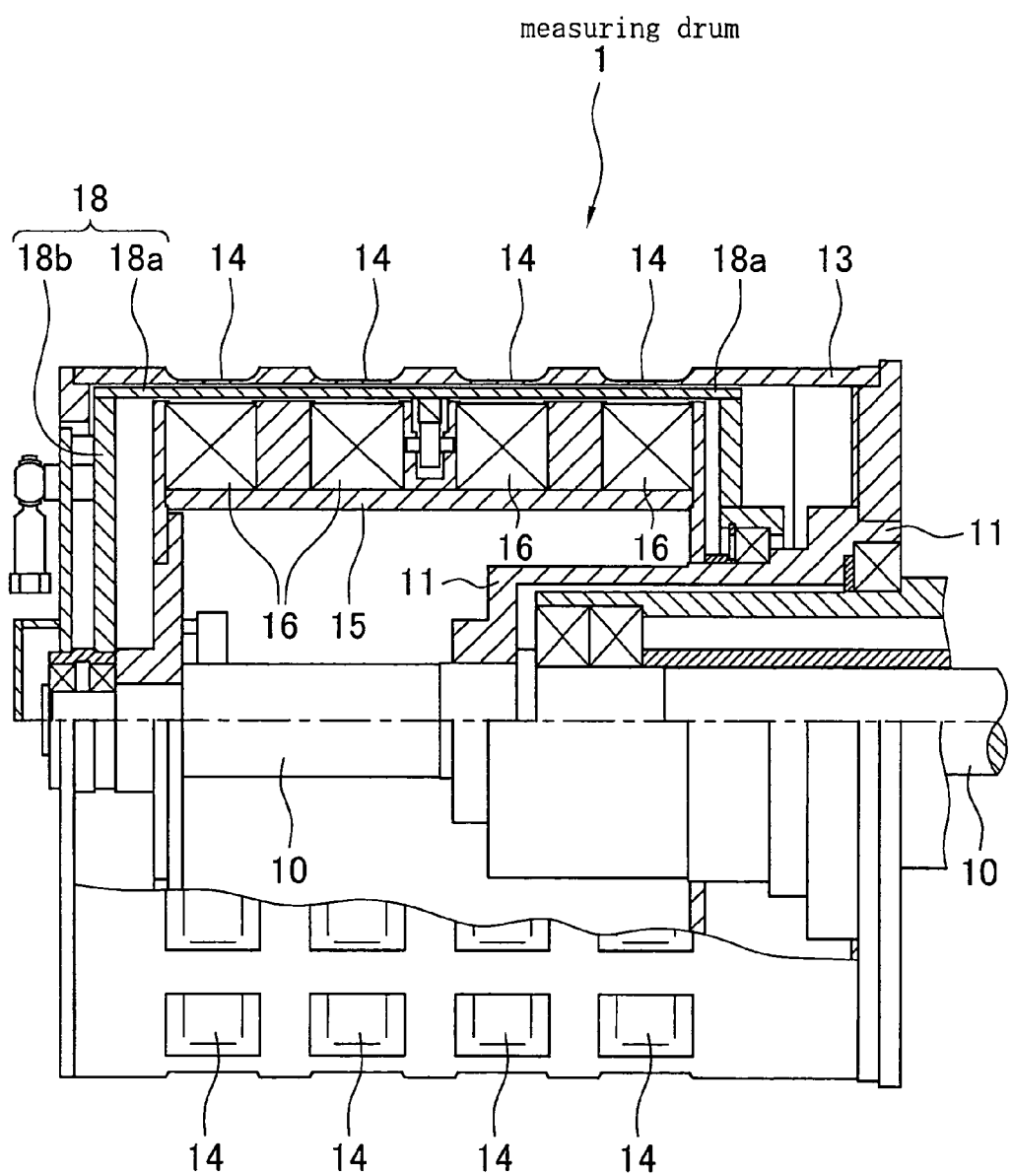
FIG. 3 is a sectional view of the measuring drum of FIG. 2.
Figure 4:
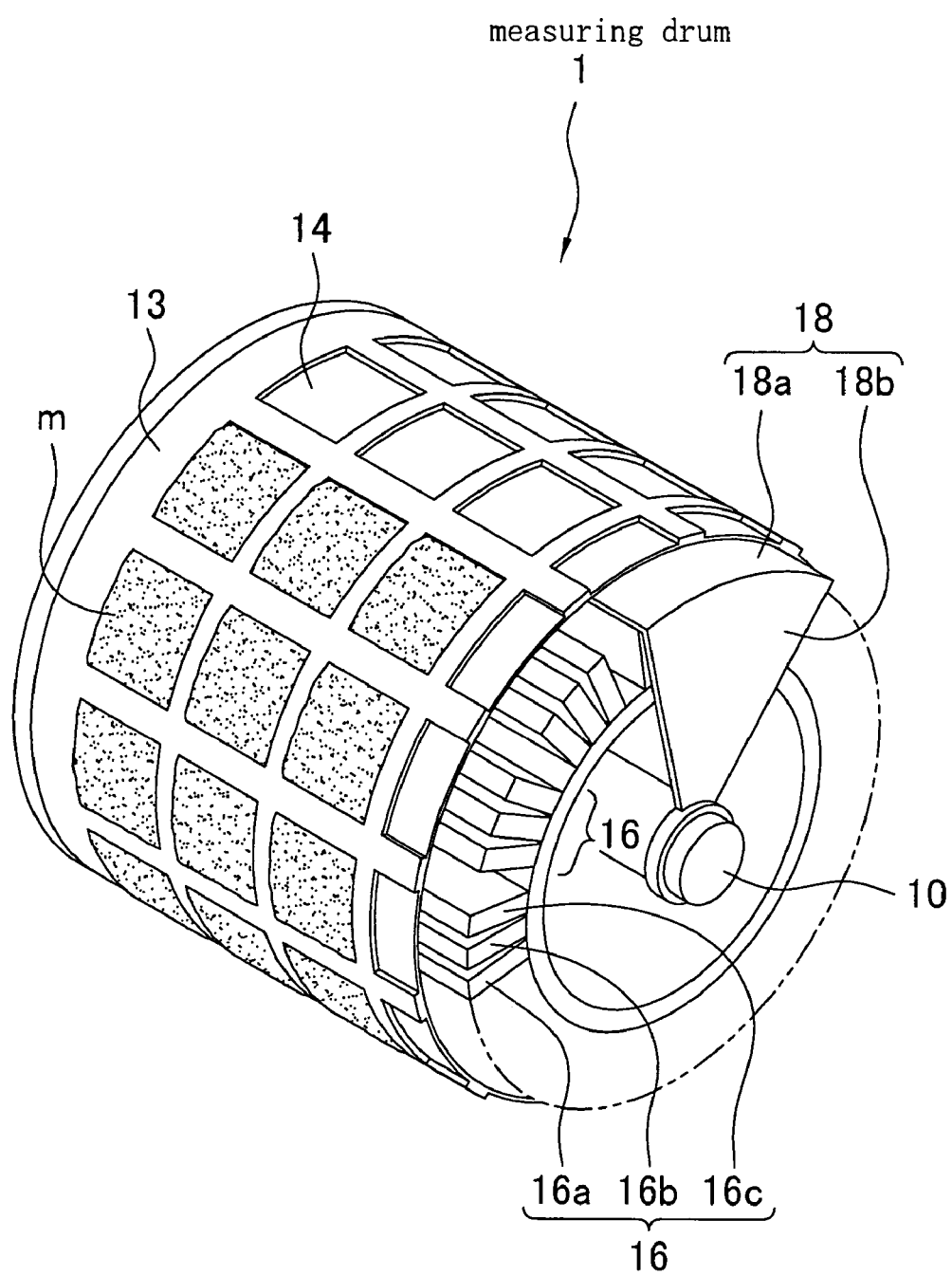
FIG. 4 is a perspective view of the measuring drum of FIG. 2.

The measuring drum 1 is now described in detail. In FIGS. 3 and 4, the reference numeral 10 is a rotating shaft driven by a drive unit such as an electric motor. An innermost cylinder 11 is fixed to the rotating shaft 10. An inner cylinder 15 and an outer cylinder 13 are fixed to the innermost cylinder 11.

Formed in the periphery of the outer cylinder 13 is a plurality of recesses 14 to contain the magnetic powder "m". Any number of recesses 14 can be formed in the periphery of the outer cylinder 13; however, in this embodiment, the recesses 14 are formed in four longitudinal, or circumferential, rows and several lateral rows from the viewpoint of productivity. Beside, the recesses 14 can be of any shape; however, in this embodiment, the recesses 14 are square to match the shape of an ordinary pocket body warmer. The dimensions of the recess 14 determine the amounts of magnetic powder "m" for pocket body warmers and the recess 14 can be of any dimensions.

As shown in FIG. 2, the means for measuring out certain amounts of magnetic powder "m" comprises doctor blades 19 which extend along the axis of the measuring drum 1 and are in contact with the periphery of the measuring drum 1. The doctor blades 19 can be in any shapes so long as they, in conjunction with the recesses 14, are capable of measuring out certain amounts of magnetic powder "m".

The means for retaining the measured-out amounts of magnetic powder "m" in the recesses 14 comprises magnets 16, which are arranged on and fixed to the periphery of the inner cylinder 15 so that each magnet 16 comes under a recess 14. Each magnet 16 is a set of three permanent magnets 16a, 16b, and 16c. The magnets 16 are arranged along the rotating direction of the measuring drum 1, their magnetic poles disposed under the recesses 14. A single permanent magnet may be used as the magnet 16. Besides, a single electromagnet may be used as the magnet 16.

Accordingly, the measured-out amounts of magnetic powder "m" in the recesses 14 are retained in them by the attraction of the magnets 16 while the measuring drum 1 is turning.

The means for cutting off the retaining force of the magnetic-powder-retaining means comprises a magnetic-screening plate 18 disposed between the magnets 16 and the outer cylinder 13 as shown in FIGS. 3 and 4 and ensures the transfer of the measured-out amounts of magnetic powder "m" from the measuring drum 1 to the sealing drum 4. The magnetic-screening plate 18 has a curved screen 18a and two support arms 18b. The radius of curvature of the curved screen 18a is slightly smaller than that of the inside of the outer cylinder 13, and the width of the curved screen 18a is smaller than that of the outer cylinder 13. The length of the curved screen 18a along the circumferential direction of the outer cylinder 13 is such that the curved screen 18a covers one to two lateral rows of magnets 16 at a time. The support arms 18b are journaled on the rotating shaft 10 so that the magnetic-screening plate 18 does not rotate along with the outer cylinder 13, but stays in any desirable fixed position. The magnetic-screening plate 18 is made of steel which cuts off magnetic force effectively; however, it may be of any materials so long as they are capable of cutting off magnetic force.

As shown in FIG. 2, the magnetic-screening plate 18 is disposed at the transfer zone between the measuring drum 1 and the sealing drum 4 so that the magnetic-screening plate 18 cuts off the magnetic force of one to two lateral rows of magnets 16 at the transfer zone. Accordingly, the measured-out amounts of magnetic powder "m" on the measuring drum 1 are attracted and transferred to the sealing drum 4 by the attraction of magnets 46 (to be described later) of the sealing drum 4.

Figure 5:
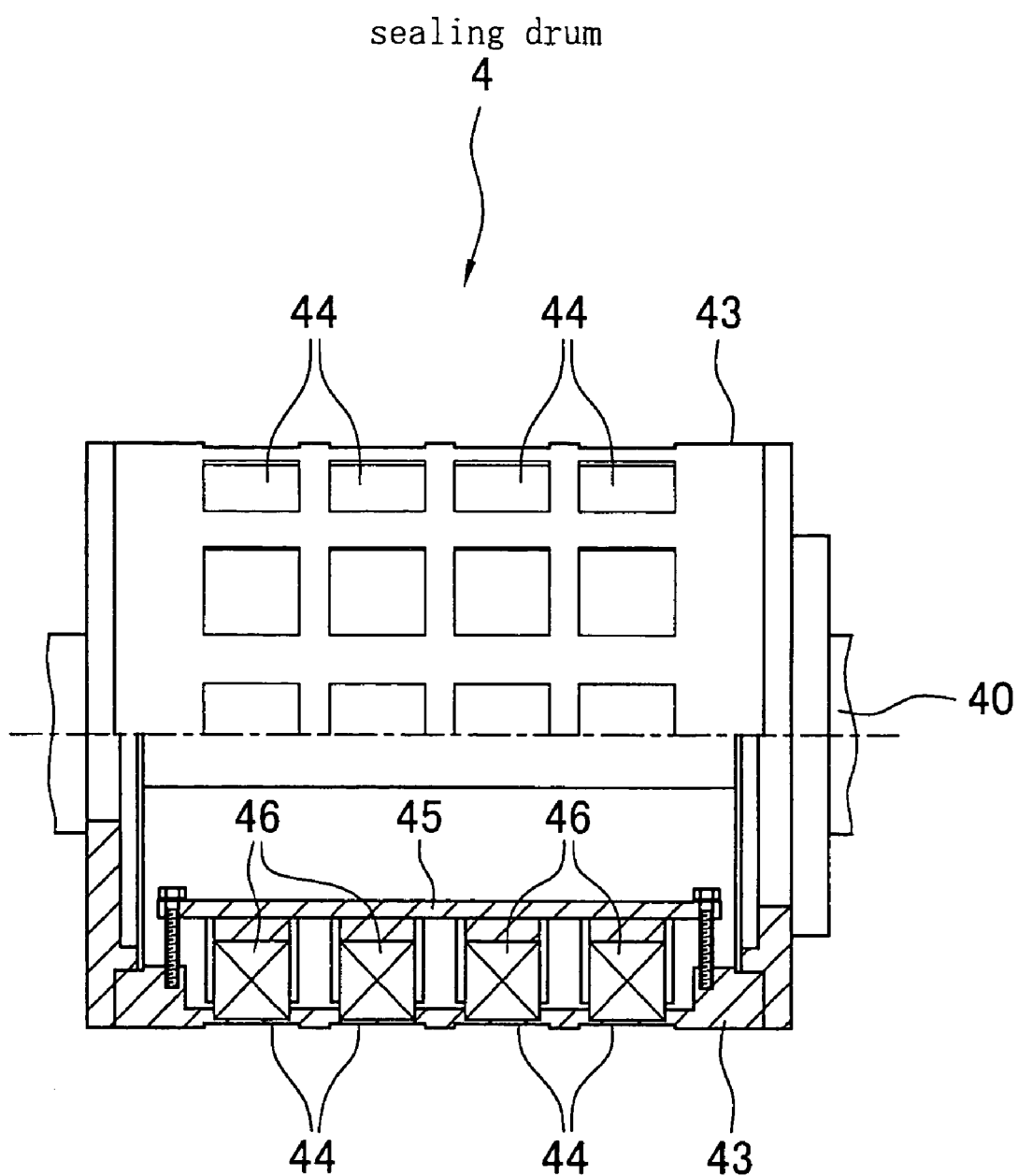
FIG. 5 is a partially sectional front view of the sealing drum of FIG. 2.

Referring to FIGS. 2 and 5, the sealing drum 4 is now described.

The sealing drum 4, in conjunction with the sealing device 5, puts the measured-out amounts of magnetic powder "m" between first and second continuous belt-like wrapping films "p" and "q" and seals the films "p" and "q" together around each measured-out amount of magnetic powder "m" to wrap up the same in the film "p/q". The sealing drum 4 will be described in detail below.

In FIG. 5, the reference numeral 40 is a rotating shaft, which is driven by a drive unit such as an electric motor. A cylindrical drum body 43 is fixed onto the rotating shaft 40.

A plurality of recesses 44 is formed in the periphery of the drum body 43 to receive the measured-out amounts of magnetic powder "m" from the recesses 14 of the measuring drum 1. The shape, dimensions, and arrangement of the recesses 44 are generally the same as those of the recesses 14.

The sealing drum 4 is provided with a means for retaining the measured-out amounts of magnetic powder "m" in the recesses 44. The magnetic-powder-retaining means comprises a plurality of permanent magnets 46, which are arranged inside the drum body 43 and supported by a support 45 so that each magnet 46 comes under a recess 44. Electromagnets may be used instead of the permanent magnets 46.

The sealing drum 4 is of thermal-drum structure to seal the first and second continuous wrapping films "p" and "q" together in conjunction with the sealing device 5. Namely, a heat source such as an electric heater is built in the rotating shaft 40 and the drum body 43 is filled with a heating medium such as oil. The heat generated by the heat source is conducted through the heating medium to the drum body 43 to keep the temperature of its periphery high enough for heat-sealing.

As shown in FIG. 2, the first continuous wrapping film "p" is fed from its roll (not shown) onto the periphery of the sealing drum 4; accordingly, the measured-out amounts of magnetic powder "m" transferred from the recesses 14 into the recesses 44 sit on the film "p" in the recesses 44 and are retained in the recesses 44 by the magnets 46 to be carried to the wrapping and sealing zone between the sealing drum 4 and the sealing device 5.

The sealing device 5 is in contact with the sealing drum 4 as shown in FIG. 2 and seals the wrapping films "p" and "q" together to wrap up the measured-out amounts of magnetic powder "m" in the film "p/q".

In FIG. 6, the reference numeral 50 is the rotating shaft of the sealing device 5. A sealing roller 51 is supported on the rotating shaft 50. Formed on the periphery of the sealing roller 51 are five longitudinal, or circumferential, sealing strips 53 and a plurality of lateral sealing strips 54. A heater cartridge (not shown) is built in the sealing device 5.

The longitudinal and lateral sealing strips 53 and 54 correspond positionally to the part of the periphery of the sealing drum 4 around the recesses 44.

As shown in FIG. 2, a second continuous wrapping film "q" is fed from its roll (not shown) onto the periphery of the sealing device 5. The second continuous wrapping film "q" runs halfway round the sealing device 5 to come to the wrapping and sealing zone between the sealing drum 4 and the sealing device 5.

Accordingly, while the sealing drum 4 and the sealing device 5 are rotating, the first and second continuous wrapping films "p" and "q" are caught and sealed together between the part of the periphery of the sealing drum 4 around the recesses 14 and the longitudinal and lateral sealing strips 53 and 54 of the sealing device 5.

As the rotational-phase synchronization between the sealing drum 4 and the sealing device 5 can easily be achieved by using gears and a timing belt, time lag or positional slippage does not occur; therefore, sealing can be made accurately.

The second sealing device 6 comprises well-known heat-sealing rollers. The sealing drum 4 and the sealing device 5 seal the first and second continuous wrapping films "p" and "q" together and the second sealing device 6 seals them together again to ensure the complete sealing of the films. If the reliability of the first sealing is high enough, the second sealing device 6 is dispensable.

The cooling device 7 comprises a pair of cooling rollers and cools the sealed part. Because the solidification of the sealed part is accelerated by cooling the hot sealed part, the next step of cutting the continuous wrapping film "p/q" into packets can be hastened.

Referring to FIGS. 1 and 2, the workings of the continuous wrapping machine A will be described below.

(1) As the measuring drum 1 turns, magnetic powder "μm" in the hopper 8 is attracted into recesses 14, which have come in front of the hopper 8, by the attraction of the magnets 16 under the recesses 14.

(2) As the measuring drum 1 turns further, the magnetic powder "m" attracted into the recesses 14 is carried toward the doctor blades 19, where surplus magnetic powder "m" is removed from over the recesses 14 by the doctor blades 19. Then, the measured-out amounts of magnetic powder "m" in the recesses 14 are carried toward the transfer zone between the measuring drum 1 and the sealing drum 4.

(3) When the measured-out amounts of magnetic powder "m" reach the transfer zone, the magnetic force of magnets 16 under the recesses 14 is cut off by the magnetic-screening plate 18 and the measured-out amounts of magnetic powder "m" in the recesses 14 are transferred into recesses 44 of the sealing drum 4 by the attraction of the magnets 46 under the recesses 44. Because a first continuous wrapping film "p" is fed onto the periphery of the sealing drum 4, the measured-out amounts of magnetic powder "m" transferred into the recesses 44 sit on the film "p" in the recesses 44.

(4) As the sealing drum 4 turns further, the measured-out amounts of magnetic powder "m" in the recesses 44 are carried toward the wrapping and sealing zone between the sealing drum 4 and the sealing device 5. Because a second continuous wrapping film "q" is fed onto the periphery of the sealing device 5, the measured-out amounts of magnetic powder "m" in the recesses 44 are caught between the first and second films "p" and "q" when the recesses 44 reaches the wrapping and sealing zone.

(5) The sealing device 5 rotates in synchronism with the sealing drum 4. As the sealing drum 4 and the sealing device 5 rotate, the first and second continuous films "p" and "q" are caught between the part of the periphery of the sealing drum 4 around the recesses 14 and the longitudinal and lateral sealing strips 53 and 54 of the sealing device 5 to be heat-sealed together as shown in FIGS. 7 and 8.

Figure 7:
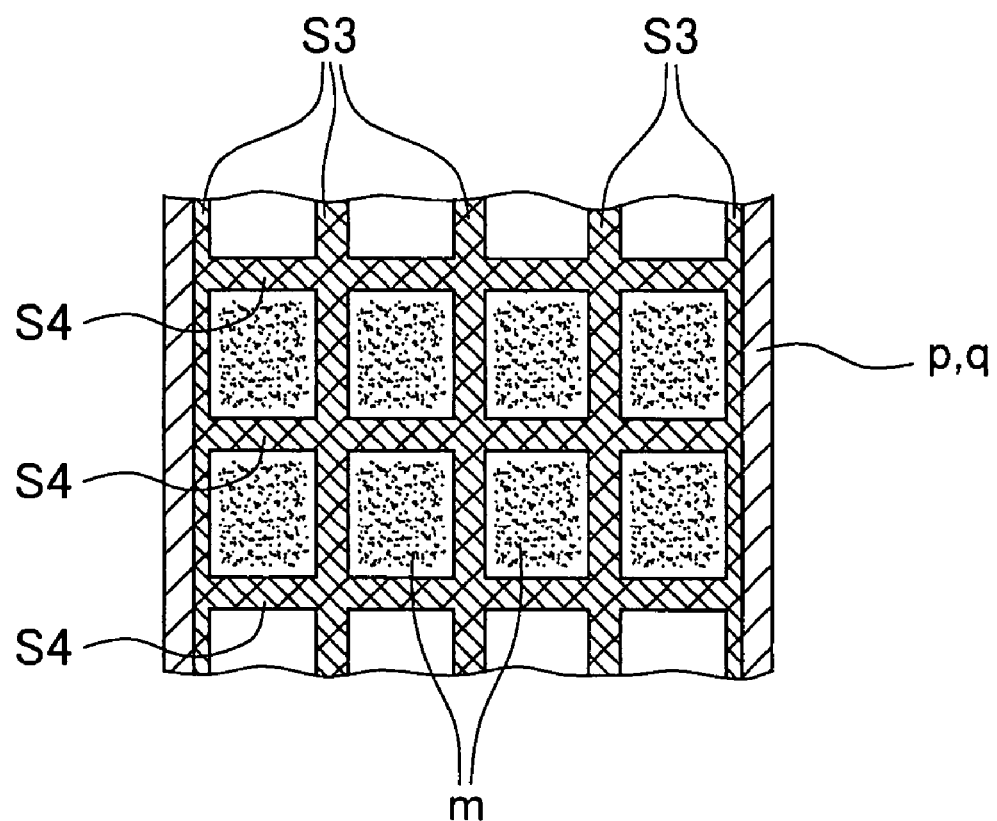
FIG. 7 is an illustration of measured-out amounts of magnetic powder sealed in wrapping film "p/q" after heat-sealing by the sealing device.
Figure 8:
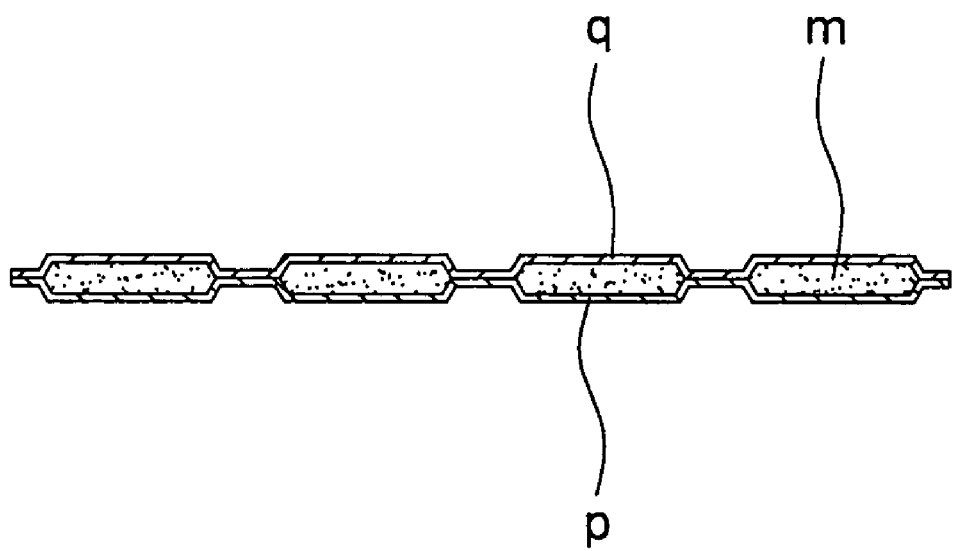
FIG. 8 is a sectional view of measured-out amounts of magnetic powder sealed in wrapping film "p/q" of FIG. 7.

In FIG. 7, S3 are the portions sealed by the longitudinal sealing strips 53 of the sealing device 5; S4, by the lateral sealing strips 54. Thus, the measured-out amounts of magnetic powder "m" in the recesses 44 are wrapped up in the film "p/q".

(6) The second sealing device 6 presses and applies heat to the portions S3 and S4 again.

The cooling device 7 cools and solidifies the portions S3 and S4.

(7) Then, the measured-out amounts of magnetic powder "m" wrapped up in the continuous wrapping film "p/q" are sent to the next step.

Namely, as shown in FIG. 1, the cutter 80 cuts the continuous film "p/q" in its portions S3 and S4 into packets, and then the packing machine 90 packs a certain number of packets at a time.

Figure 9:
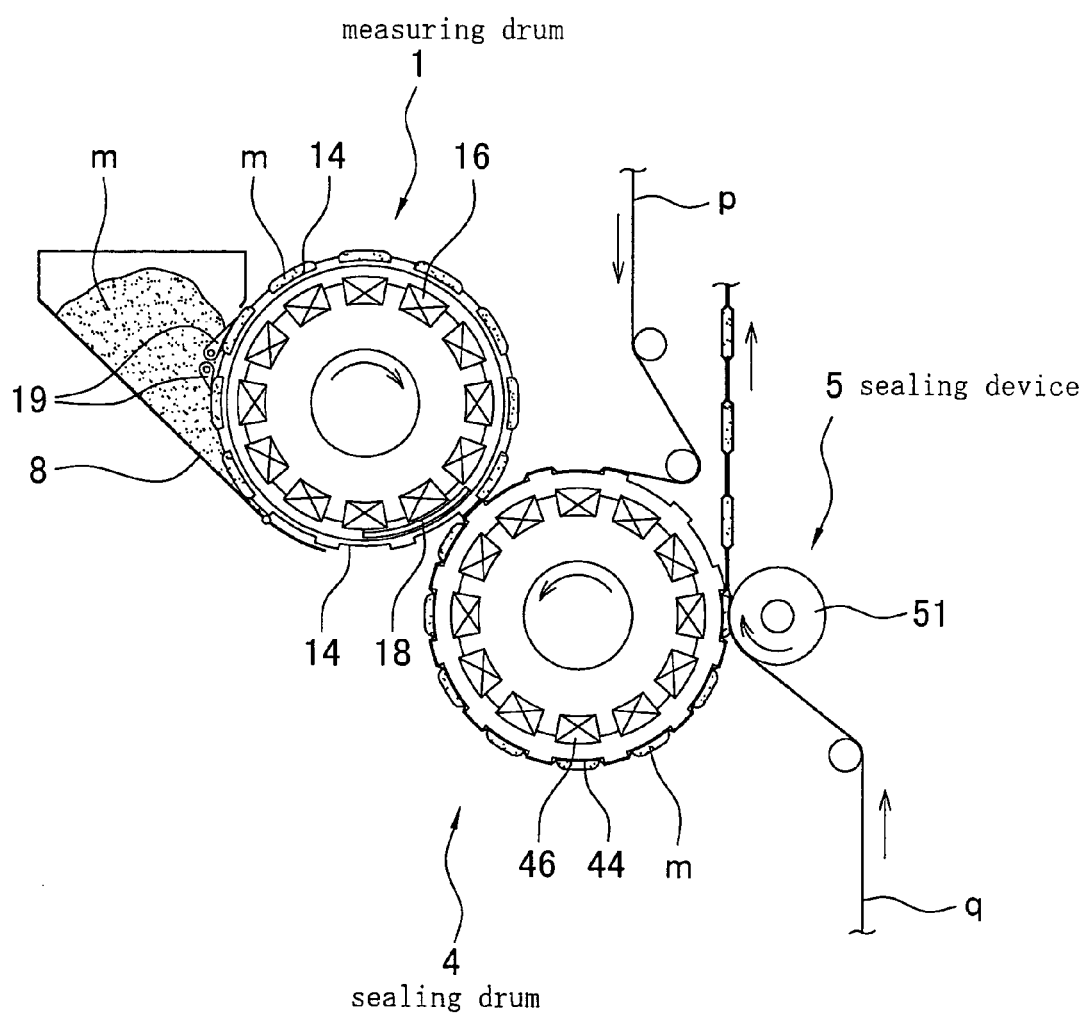
FIG. 9 is a side view of the main part of another embodiment of continuous wrapping machine according to the present invention.

Referring to FIG. 9, the second embodiment of continuous wrapping machine "A" of the present invention is now described.

In the first embodiment, the relative positions of the measuring drum 1 and the sealing drum 4 can be determined freely so long as they can perform their functions. The same is true of the relative positions of the sealing drum 4 and the sealing device 5.

In FIG. 9, the measuring drum 1 is disposed to the upper left; the sealing drum 4, to the lower right. As compared with their arrangement in the first embodiment of FIG. 2, the measuring drum 1 is raised and the sealing drum 4 is lowered. Besides, the sealing device 5 is disposed not on the top of the sealing drum 4 as in FIG. 2, but on the right side of the sealing drum 4.

In this embodiment, as the measuring and sealing drums 1 and 4 and the sealing device 5 rotate, certain amounts of magnetic powder "m" are measured out by the measuring drum 1, transferred from the measuring drum 1 to the sealing drum 4, caught between first and second continuous wrapping films "p" and "q", and sealed up in the wrapping film "p/q" by the sealing device 5.

In FIG. 9, the continuous film "p/q" after being heat-sealed goes vertically upward. It may undergoes the processing in all or some of the following steps while going vertically upward or it may be turned into a horizontal direction by using a guide roller before going through the following steps.

Figure 10:
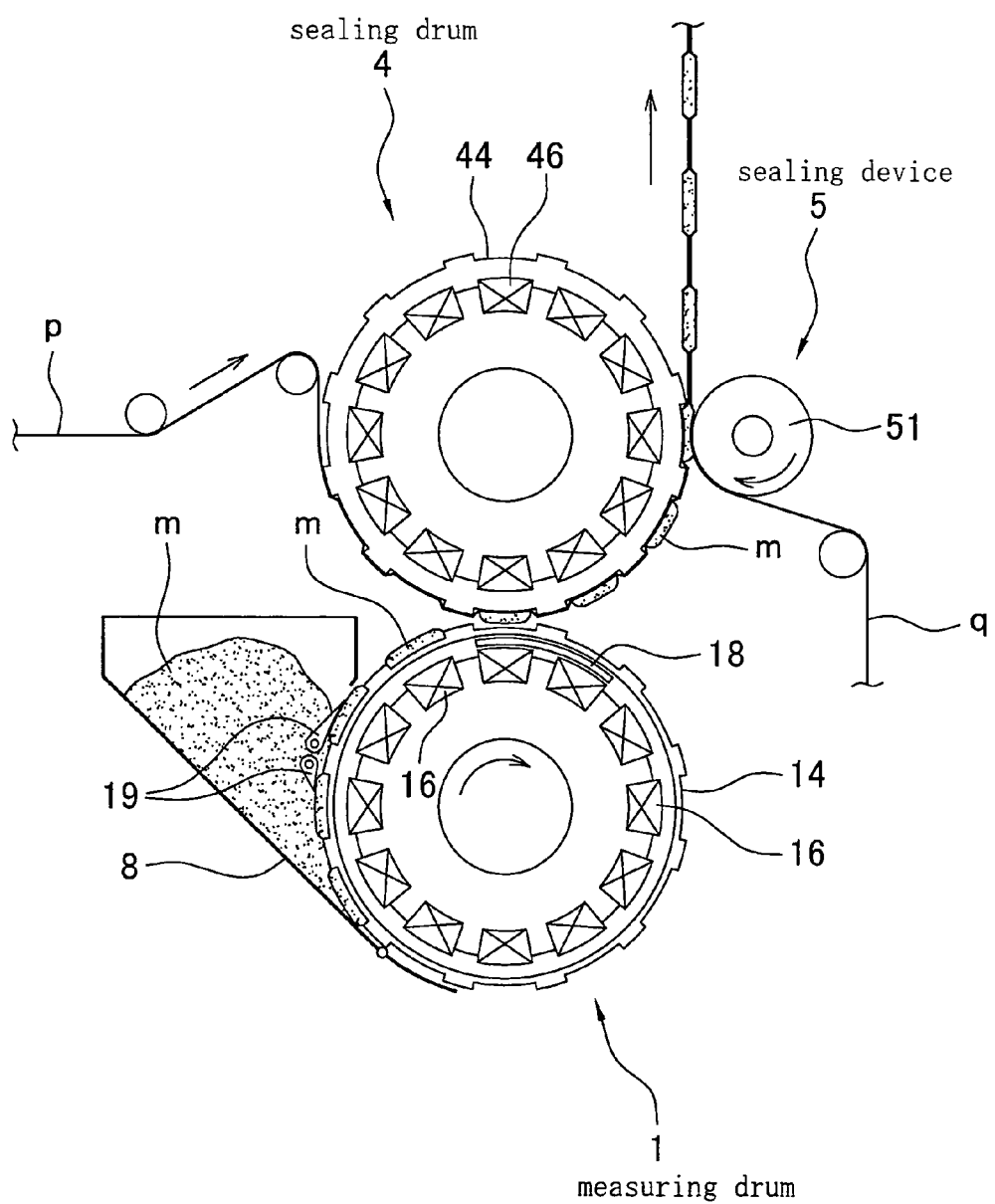
FIG. 10 is a side view of the main part of still another embodiment of continuous wrapping machine according to the present invention.

FIG. 10 shows still another embodiment of the present invention, wherein the sealing drum 4 is disposed on the top of the measuring drum 1.

In this embodiment too, as the measuring and sealing drums 1 and 4 and the sealing device 5 rotate, certain amounts of magnetic powder "m" are measured out by the measuring drum 1, transferred from the measuring drum 1 to the sealing drum 4, caught between first and second continuous wrapping films "p" and "q", and sealed up in the wrapping film "p/q" by the sealing device 5.

In FIG. 10, the continuous film "p/q" after being heat-sealed goes vertically upward. It may undergoes the processing in all or some of the following steps while going vertically upward or it may be turned into a horizontal direction by using a guide roller before going through the following steps.

It is apparent that any arrangement of the measuring drum 1, the sealing drum 4, and the sealing device 5 other than the above is possible so long as continuous measuring and wrapping/sealing are possible.

As described above, with the continuous wrapping machine "A" of the present invention, disposable packet body warmers can continuously produced by measuring out certain amounts of magnetic powder "m" and wrapping and sealing them in films "p" and "q", all the measuring and wrapping/sealing done on the measuring and sealing drums 1 and 4. Therefore, time lag or positional slippage does not occur, dispensing with timing gear. Thus, the measuring and wrapping/sealing of magnetic powder "m" can be done continuously, easily, and efficiently. Besides, because the main bulky components of the continuous wrapping machine "A" are only the measuring and sealing drums 1 and 4, the continuous wrapping machine A is relatively compact.

The material "m" of disposable pocket body warmers mentioned above is just an example of magnetic powders which the continuous wrapping machine of the present invention can handle. Therefore, the continuous wrapping machine and the continuous wrapping method of magnetic powder are applicable to any industrial fields.

The invention may be embodied in other specific forms without departing from the spirit or essential characteristics thereof. The above embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A continuous wrapping machine for wrapping a magnetic powder in wrapping film, comprising:
   a rotatable measuring drum;
   a stationary magnetic screening plate;
   a rotatable sealing drum;
   a rotatable sealing device; and
   a stationary hopper containing the magnetic powder and disposed adjacent the measuring drum,
   the measuring drum having an outer cylindrical measuring drum surface with a plurality of measuring drum recesses formed therein with each measuring drum recess sized to receive measured amounts of the magnetic powder from the hopper as the measuring drum rotates, the measuring drum including measuring drum magnets arranged inside the measuring drum for magnetically retaining the measured amounts of the magnetic powder in the respective measuring drum recesses,
   the sealing drum being disposed adjacent the measuring drum and having an outer cylindrical sealing drum surface that receives a first continuous wrapping film from a first continuous wrapping film source, the sealing drum having a plurality of sealing drum recesses formed into the sealing drum surface with a respective sealing drum recess sized to receive the measured amounts of the magnetic powder from a corresponding measuring drum recess, the sealing drum including sealing drum magnets arranged inside the sealing drum,
   the measuring drum magnetic screening plate disposed internally of the measuring drum in a stationary state between the measuring drum magnets and the outer cylindrical measuring drum surface such that, as the measuring drum and the sealing drum simultaneously rotate, the measuring drum magnetic screening plate cuts off a measuring drum magnetic retaining force of the measuring drum magnets so that a sealing drum magnetic force of the sealing drum magnets attracts the measured amounts of the magnetic powder from the respective measuring drum recess and into an opposing sealing drum recess with a portion of the first continuous wrapping film disposed therein thereby transferring the measured amounts of the magnetic powder from the measuring drum directly to the sealing drum and retaining the magnetic powder and the portion of first continuous wrapping film in the respective sealing drum recesses, and the sealing device having a cylindrically-shaped sealing device outer surface that receives a second continuous wrapping film from a second continuous wrapping film source and applies the second continuous wrapping film onto exposed portions of first continuous wrapping film as the second continuous wrapping film is being conveyed while the sealing drum and the sealing device are simultaneously rotating, the sealing device operative for sealing the exposed portions of the first continuous wrapping film and the second continuous wrapping film together.

2. The continuous wrapping machine according to claim 1, wherein the measuring drum magnets are arranged under the plurality of measuring drum recesses.

3. The continuous wrapping machine according to claim 1 wherein the sealing device comprises a sealing roller with sealing strips on its periphery for sealing the exposed portions of the first continuous wrapping film and second continuous wrapping film together around each of the measured amounts of the magnetic powder.

4. The continuous wrapping machine according to claim 1, further comprising at least one doctor blade having a knife edge and being disposed inside the hopper.

* * * * *